United States Patent [19]

Kinjo et al.

[11] 3,805,285

[45] Apr. 16, 1974

[54] SIGNAL MODULATING AND DEMODULATING SYSTEM WITH MEANS FOR MAKING THE UPPER AND LOWER SIDE-BANDS ASSYMMETRICAL

[75] Inventors: Hisao Kinjo; Keigo Okano, both of Tokyo, Japan

[73] Assignee: Victor Company of Japan, Ltd., Yokohama-City, Kanagawa-ken, Japan

[22] Filed: Apr. 25, 1972

[21] Appl. No.: 247,419

[30] Foreign Application Priority Data

Apr. 26, 1971 Japan .............................. 46-27453
Apr. 26, 1971 Japan .............................. 46-27454

[52] U.S. Cl. ......................... 360/29, 332/41, 360/24
[51] Int. Cl. ........ G11b 5/82, G11b 5/04, H04n 5/78
[58] Field of Search .............. 179/100.2 R, 100.2 K; 332/22, 41; 178/6.6 A, 6.6 DD

[56] References Cited

UNITED STATES PATENTS

| | | | |
|---|---|---|---|
| 3,660,596 | 5/1972 | Numakura | 178/6.6 A |
| 3,704,341 | 11/1972 | Fujita | 178/6.6 A |
| 3,647,953 | 3/1972 | Booker et al. | 178/6.6 A |
| 3,218,578 | 11/1965 | Mifflin | 332/41 |
| 3,629,494 | 12/1971 | Hurst | 178/6.6 A |
| 2,822,523 | 2/1958 | Bargellini | 332/22 |
| 3,330,907 | 7/1967 | Arimura et al. | 179/100.2 R |
| 3,324,414 | 6/1967 | Numakura | 325/47 |
| 3,405,232 | 10/1968 | Morrow et al. | 179/100.2 R |
| 3,385,926 | 5/1968 | Tanaka et al. | 178/6.6 A |
| 3,679,822 | 7/1972 | Wada et al. | 178/6.6 DD |

*Primary Examiner*—Bernard Konick
*Assistant Examiner*—Alfred H. Eddleman

[57] ABSTRACT

A signal modulating and demodulating system generally comprises means for amplitude modulating at least a part of a signal, means for making the upper and lower side-bands of the amplitude modulated wave asymmetrical, and means for frequency demodulating the amplitude modulated wave having asymmetrical upper and lower side-bands. By magnetically recording and reproducing the amplitude modulated wave, it has its upper and lower side-bands made asymmetrical due to an electromagnetic conversion characteristic and is converted into a frequency modulated wave.

10 Claims, 18 Drawing Figures

SIGNAL MODULATING AND DEMODULATING SYSTEM WITH MEANS FOR MAKING THE UPPER AND LOWER SIDE-BANDS ASSYMMETRICAL

BACKGROUND OF THE INVENTION

This invention relates to a modulating and demodulating system for amplitude modulating and frequency demodulating a signal and, more particularly, to a system for frequency demodulating an amplitude modulated wave which is afforded a characteristic similar to that of a frequency modulated wave, by utilization of an electromagnetic conversion characteristic accompanying magnetic recording and reproducing.

An FM system by the Ampex Corporation has been a typical magnetic recording and reproducing system for a video signal. According to this FM system, a video signal is frequency modulated as a whole. Therefore, it is recorded and reproduced on a magnetic tape. With regard to a color video signal, the whole signal including chrominance subcarrier is frequency modulated. This, however, tends to produce a beat frequency due to cross modulation between the 3.58 MHz frequency of the chrominance subcarrier and the carrier frequency, which is in the vicinity of that of the chrominance subcarrier. Consequently, unnecessary components are brought in the signal by the cross modulation or intermodulation between the two frequencies. These components cause a Moire effect in the reproduced picture and the quality of the picture.

According to this FM system, a broad frequency band of the whole input video signal (e.g. 0–4.5 MHz) is frequency modulated. Accordingly, the bandwidth of the side band increases in proportion to a modulation index *mf*. If the modulation index *mf* becomes large, a very broad band is required for recording and reproducing of a signal. If conditions of the required frequency band and linearity of a color characteristic, particularly conditions for obtaining satisfactory differential phase (DP) and differential gain (DG) are considered, the modulation index cannot be made unlimitedly large. It must be selected, from a practical standpoint, at a value of $mf = \Delta f/fm = 0.4$ or less (where mf represents the modulation index, i.e. the ratio of deviation from the center of frequency modulated wave. The symbol $\Delta f$ deviation corresponds to the maximum amplitude of the signal, and fm the maximum frequency of a modulating signal. Consequently, it is practically impossible in this FM system to obtain a modulation index exceeding 1. Thus, the signal to noise ratio of the reproduced picture cannot be made sufficiently large.

With a view to eliminating the above described disadvantages of the prior art FM system, the applicant of the present application proposed a novel video signal recording and reproducing system in the copending U.S. patent application Ser. No. 12301 filed Feb. 18, 1970, now U.S. Pat. No. 3723638, entitled "A color video signal recording and reproducing system" and the copending U.S. patent application Ser. No. 88350 filed Nov. 10, 1970 now U.S. Pat. No. 3715468, entitled "A color video signal recording and reproducing system" which is a continuation-in-part application of the former. In the proposed system, a video signal is divided into a low frequency component and a high frequency component. The low frequency component alone is frequency modulated and superposed on the direct wave of high frequency component for recording and reproducing. My proposed system is advantageous in that (1) it uses a frequency band which is broader than that used in the prior art FM system; (2) accordingly, the linear velocity of the magnetic head can be reduced relative to the magnetic tape, when a frequency band of the same order as the prior art FM system is employed; (3) a color video signal can be recorded and reproduced without intermodulation because chrominance subcarrier is directly recorded, so that adverse effects such as Moire effects can be eliminated.

It must be admitted, however, that the proposed system has the following problems:

1. The proposed system is a simplified system and is not suitable for a case in which the relative linear velocity between the magnetic medium and the magnetic head is large. This proposed system directly records components in a frequency band of 0.5 to 4 MHz. In this frequency band, there is a low response sensitivity for both recording and reproducing. The signal to noise ratio is poor because there is a large distortion. As a result, there is a low efficiency and a poor signal to noise ratio in both recording and reproducing. Particularly, a combined level of a DC component cannot be obtained, resulting in a poor signal to noise ratio.

2. Since the high frequency component is directly recorded and reproduced, no limiter can be used for the high frequency component during reproduction. Therefore, adverse effects of a level fluctuation, due to various causes including changes of abutment of the magnetic head against the magnetic medium, cannot be eliminated.

3. Since the signal passes through many filters, such as a filter for dividing the frequency band and a filter for removing unnecessary components both during recording and reproducing, the envelope delay (phase distortion of the envelope), pulse and phase characteristics of the signal become worse each time it passes through one of the filters, with a result that signals between the high frequency component and the low frequency component cannot sufficiently be compensated.

4. A reproduced picture of a high quality cannot be obtained due to cross modulation and mutual influence between the FM component and the direct wave component etc.

SUMMARY OF THE INVENTION

It is, therefore, a general object of the invention to eliminate the above described disadvantages of the prior art FM system and solve the problems of the proposed system by providing a novel and useful signal modulating and demodulating system which is generally applicable to a system in which a signal is modulated and demodulated in the transmission of the signal.

Another object of the invention is to provide a system which amplitude modulates a signal, converts the amplitude modulated wave into a frequency modulated wave by making the upper and lower side-bands of the amplitude modulated wave asymmetrical and thereafter frequency demodulates the signal. This system enables the amplitude modulated wave to pass through an amplitude limiter. As a result, variation in the signal level and modulation noise are effectively eliminated, and a large signal to noise ratio is obtained. Further, the signal has advantages peculiar to an amplitude modulated wave such as an effective band utilization and an excellent phase characteristic.

A further object of the invention is to provide a system which amplitude modulates a signal, converts the amplitude modulated wave into a frequency modulated wave by making the upper and lower side-bands of the amplitude modulated wave asymmetrical due to the electromagnetic conversion characteristic, during magnetic recording and reproducing, and thereafter frequency demodulates the signal.

A still further object of the invention is to provide a signal modulating and demodulating system which divides the frequency band of the signal to be transmitted into two bands, frequency modulates its low frequency component and amplitude modulates its high frequency component, magnetically records and reproduces a combined wave of the amplitude modulated wave and the frequency modulated wave, and thereafter demodulates the same. According to this system, the frequency band can be effectively utilized. The signal to noise ratio is improved because the modulation index of the frequency modulated wave can be increased. Further, construction of the demodulation system can be simplified because both the amplitude modulated and frequency modulated waves are demodulated by a single frequency demodulator.

Other objects and features of the invention will become apparent from the description made hereinbelow with reference to the accompanying drawings.

DETAILED DESCRIPTION

Figure 1:
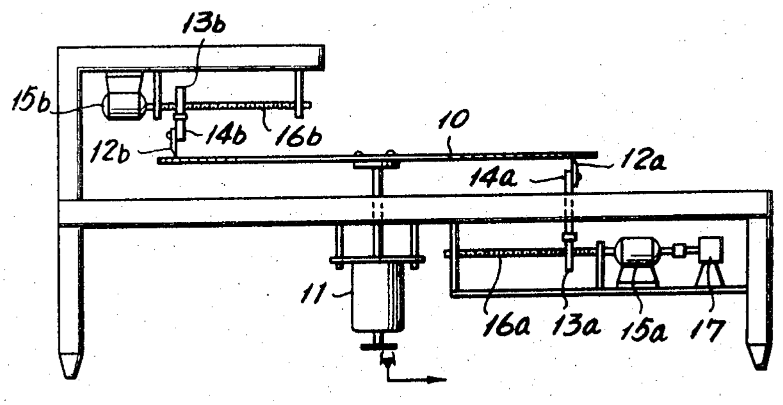
FIG. 1 is a side view of an example of a magnetic recording and reproducing apparatus employing a signal modulating and demodulating system according to the invention.

FIG. 1 shows a side view of a video signal magnetic recording and reproducing apparatus, of a magnetic disc type, shown as an example of a magnetic recording and reproducing apparatus in which the system according to the invention can be employed. A rotary magnetic disc 10 is coated with magnetic surfaces on the upper and lower sides thereof. The magnetic disc 10 has a diameter of, for example, 410 mm. The magnetic disc 10 is rotated by a disc motor 11 at a rotational speed of 3600 rpm, in synchronization with a vertical synchronizing signal in the input video signal. Recording and reproducing magnetic heads 12*a* and 12*b* (also designated generally by reference numeral 12 hereinafter) are respectively supported by head supports 14*a* and 14*b* having half nuts 13*a* and 13*b*. They are in abutting engagement with the upper and lower surfaces of the magnetic disc 10. Pulse motors 15*a* and 15*b* respectively have feed screws 16*a* and 16*b* fixed to their rotational shafts. The half nuts 13*a* and 13*b* are respectively in threaded engagement with the feed screws 16*a* and 16*b*. A variable resistor 17, for correcting the variations caused by the differences in the diameter of the disc at the point of recording, is mounted on the rotational shaft of the pulse motor 15*a*.

The pulse motors 15*a* and 15*b* are alternately and intermittently rotated. The magnetic heads 12*a* and 12*b* are driven by the pulse motors 15*a* and 15*b* and move in a stepping movement, alternately and intermittently, in a radial direction across the magnetic disc 10. The magnetic heads 12*a* and 12*b* alternately record video signals, by each field, on the magnetic disc 10 while the heads are at a standstill. The magnetic heads 12*a* and 12*b* are fed by two track pitches responsive the rotation of the pulse motors 15*a* and 15*b*, when the pulse motors 15*a* and 15*b* receive two pulses, and by one pitch when the pulse motors 15*a* and 15*b* receive one pulse. The magnetic heads 12*a* and 12*b* fed by two track pitches from the outer periphery to the inner periphery or from the inner periphery to the outer periphery on the magnetic disc 10 and by one pitch only when the stepping movement is reversed. Accordingly, concentric tracks are alternately formed by the magnetic heads 12*a* and 12*b* in accordance with their respective directions of the stepping movements.

As the magnetic heads 12*a* and 12*b* move radially across the magnetic disc 10, the relative linear velocity between the magnetic heads 12*a*, 12*b* and the magnetic disc 10 changes gradually. In the present embodiment, the relative linear velocity is 34 m/sec in the inner diameter and 76 m/sec in the outer diameter, more than double that in the inner diameter. Accordingly, the optimum recording level on the recording medium, frequency characteristic etc. change in accordance with the radial positions of the magnetic heads on the disc. Hence, characteristic compensation in the diameter difference with respect to the relative variable resistor 17 is provided for this purpose.

One embodiment of the system according to the invention which is applicable to the above described magnetic recording and reproducing apparatus will be described with reference to FIG. 2.

Figure 3:
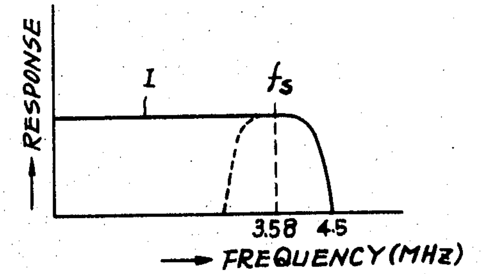
FIG. 3 is a diagram showing a frequency spectrum of an input video signal.
Figure 2:
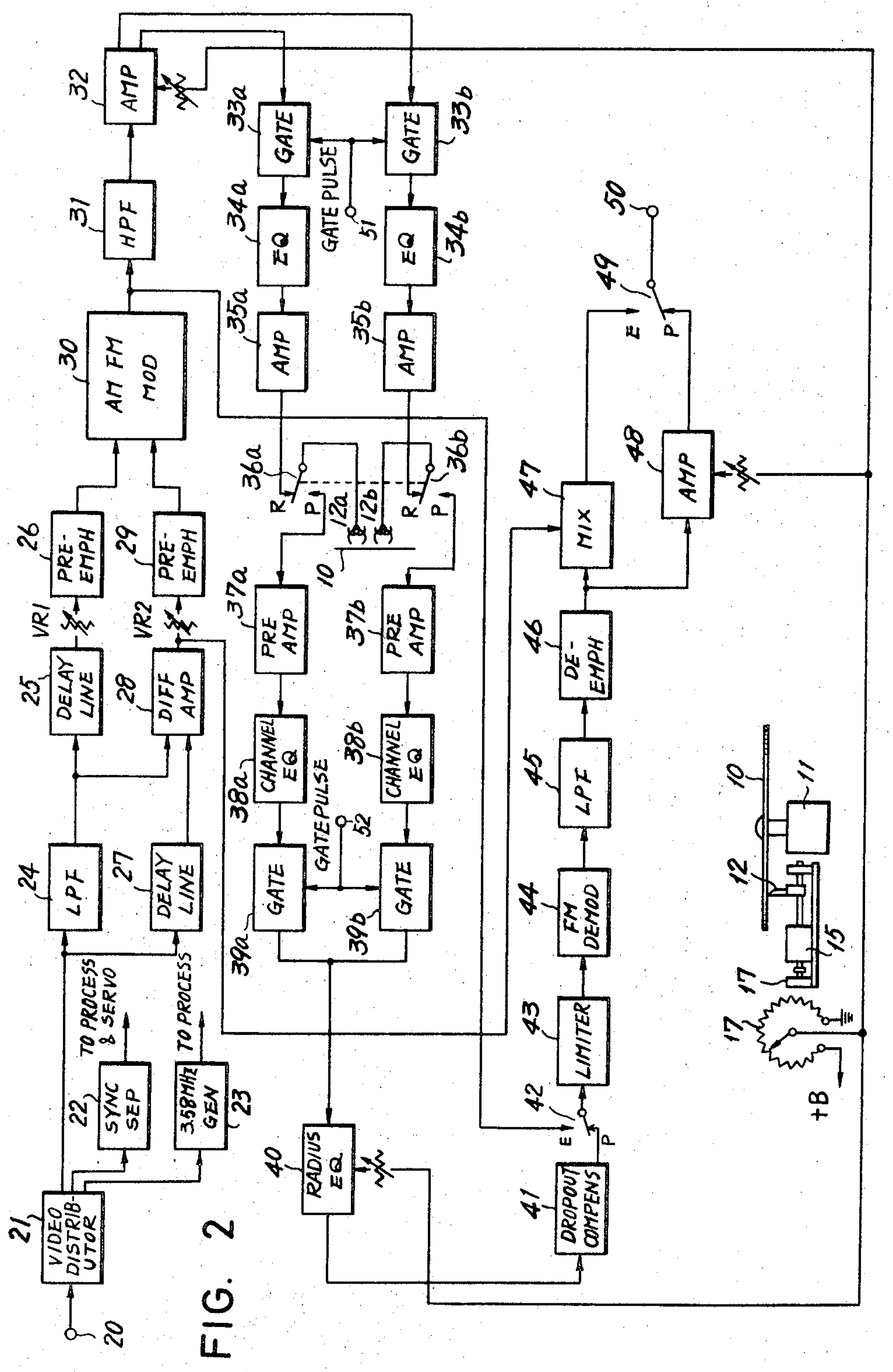
FIG. 2 is a block diagram of one embodiment of the signal modulating and demodulating system according to the invention applied to the magnetic recording and reproducing apparatus shown in FIG. 1.

FIG. 2 shows a block diagram of one embodiment a magnetic recording and reproducing system employing the signal modulating and demodulating system according to the invention. When the system is in a record mode, an input color video signal having a frequency band designated by I in FIG. 3 (upper limit frequency being 4.5 MHz), is applied to an input terminal 20. The input signal is separated by a video distributor 21 into three bands. One band of the video signal thus separated is supplied to a low-pass filter 24 and a delay line 27. The other two bands of the video signal are respectively supplied to a synchronizing signal separator 22 where the synchronizing signal is separated from the video signal; and to a subcarrier generator 23 where continuous signals of 3.58 MHz are generated. The resulted synchronizing signal and the subcarrier signal are respectively transmitted to a servo system and a color process system.

Figure 4A:
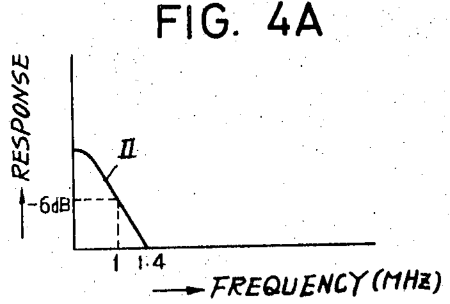
FIGS. 4A and 4B are diagrams respectively showing a frequency spectrum of divided frequency bands of the input video signal shown in FIG. 3.

The low-pass filter 24 has a filtering band of 0 to 1.4 MHz as shown by II in FIG. 4A and also has a linear falling characteristic of 6 dB/oct. which passes −6 dB at 1 MHz. The low frequency component of the video signal, filtered through the low-pass filter 24, is corrected in the amount of delay by a delay line 25. The delay presents an occurrence of phase difference between an amplitude modulated wave and a frequency modulated wave which are generated in a modulator 30, as will be described later. The low frequency component which has passed through the delay line 25 is adjusted in its level by a variable resitor $VR_1$. Thereafter, the signal is provided with inclination to the frequency amplitude characteristic in a pre-emphasis circuit 26 so as to improve the signal to noise ratio.

The output low frequency component of the circuit 26 is supplied to a combined AM-FM modulator 30 where it is frequency modulated, as will be described more in detail later. The frequency modulated wave is shown by a broken line IV′ in FIG. 5. A carrier frequency Fc is selected at a sufficiently high frequency (for example 11.5 MHz) and is frequency modulated by the low frequency component of 0 to 1.4 MHz with a frequency deviation of 3 MHz. The modulation index *mf* is:

*a.* If the upper limit frequency fm of the low frequency component is $$fm = 1.4 \text{ MHz},$$

$$mf = \Delta f/fm = (3/2)/(1.4) = 1.07$$

*b.* If the upper limit frequency $f'm$ at the attenuation point of −6 dB is $$f'm = 1 \text{ MHz},$$

$$mf = \Delta f/f'm = (3/2)/(1) = 1.5$$

Although the modulation index mf is not limited to the above described values, the modulation is made with a large modulation index which is greater than unity. Accordingly, the low frequency component, which provides a major portion of energy required for reproducing a picture from the video signal, is frequency modulated with a large modulation index. Therefore, the signal to noise ratio of the low frequency component upon which the quality of the reproduced picture depends to a large extent is greatly improved.

Figure 4B:
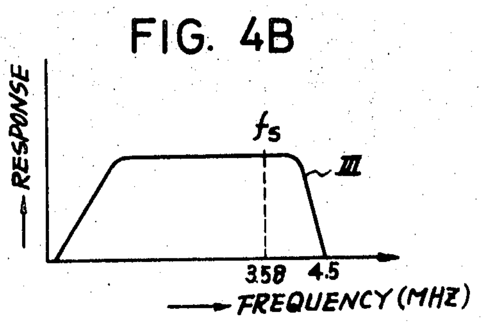

The video signal supplied to a delay line 27 is delayed by the same time increment as the delay time which the low frequency signal component receives in the low-pass filter 24. Thereafter, it is supplied to a differential amplifier 28. The differential amplifier 28 simultaneously receives from the low-pass filter 24 the low frequency component having the frequency response characteristic represented by the line II in FIG. 4A. As a result, the low frequency component represented by the line II in FIG. 4A is produced in the differential amplifier 28 from the video signal represented by the line I in FIG. 3 from the delay line 27. Whereby, the differential amplifier 28 provides only a high frequency signal component having a frequency response characteristic represented by a line III in FIG. 4B.

It is to be noted that the rising portion of high frequency component III has a characteristic opposite to that of the falling portion of the low frequency component II. The delay phase characteristics of the rising and falling portions exactly coincide with each other. Accordingly, by dividing the frequency band by means of the differential amplifier 28, an occurrence of phase distortion between the two components can be avoided when the two components are mixed together thereafter.

The output high frequency component of the differential amplifier 28 is adjusted in its level by a variable resistor $VR_2$. Thereafter, it is supplied to a pre-emphasis circuit 29 for correcting its frequency amplitude characteristic. The output high frequency component of the circuit 29 is supplied to the modulator 30 where it is amplitude modulated. For amplitude modulating this high frequency component, the frequency modulated carrier of the low frequency component, supplied from the pre-emphasis circuit 26, is used as a carrier for amplitude modulation. The upper and lower side bands fo the amplitude modulated wave, of the high frequency component obtained from the modulator 30, are illustrated by broken lines V*a*′ and V*b*′ in FIG. 5. The frequency modulated wave which corresponds to the carrier of the amplitude modulated wave is shown by a broken line IV′. By modulating the high frequency component in the above described manner, the two components are superposed one upon the other without an undesirable intermodulation. A combined AM-FM wave is obtained from the same carrier. The whole frequency band of the upper and lower side bands V*a*′ and V*b*′ of the amplitude modulated wave is between 7.5 MHz and 15.5 MHz, the bandwidth being 8 MHz.

Figure 6:
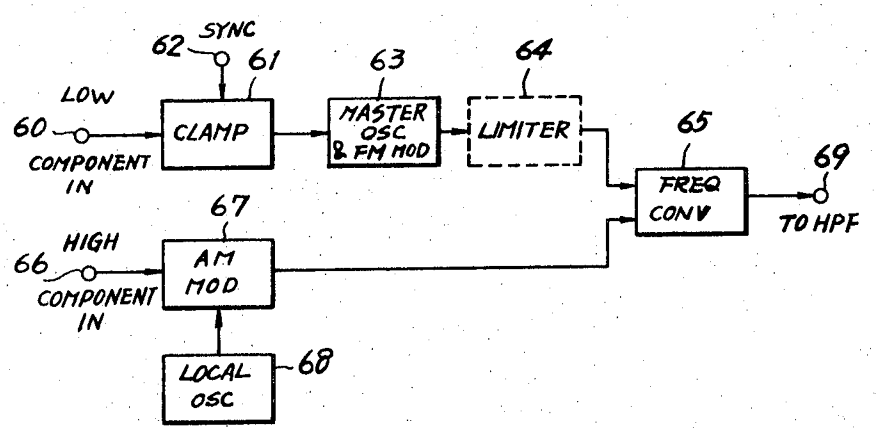
FIG. 6 and FIG. 7 are block diagrams respectively showing embodiments of the combined AM-FM modulator shown in FIG. 2.
Figure 7:
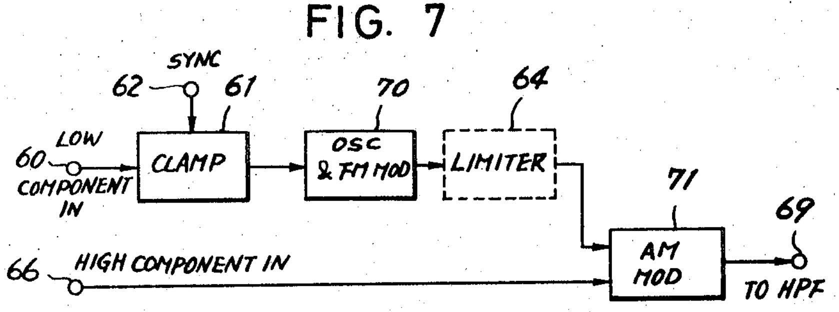

Embodiments of the combined AM-FM modulator 30 are illustrated in FIG. 6 and FIG. 7. In the first embodiment shown in FIG. 6, the low frequency component applied to a terminal 60 from the pre-emphasis circuit 26 is supplied to a clamp circuit 61. In the clamp circuit 61, the low frequency component is clamped in its pedestal level by a synchronizing signal from a terminal 62. The output signal of the clamp circuit 61 is supplied to a frequency modulator 63 where a carrier from a master oscillator is frequency modulated. This carrier has a MHz frequency multiplied by more than several tens. The frequency modulated signal tends to have an AM variation, although only slightly. This AM variation is removed from the low frequency component frequency modulated wave by an amplitude limiter 64. The frequency modulated wave is then supplied to a frequency converter 65. In the meanwhile, the high frequency component received from the pre-emphasis circuit 29 is applied to a terminal 66 and therefore supplied to an amplitude modulator 67, where a carrier generated by a local oscillator 68, and having a frequency which is lower than that of the carrier generated by the master oscillator by 11.5 MHz is amplitude modulated by the high frequency component. The high frequency component thus amplitude modulated wave is also supplied to the frequency converter 65. The frequency converter 65 has an output with only a frequency which is a difference between the two carriers. Accordingly, a combined AM-FM wave of a carrier having a frequency of 11.5 MHz is obtained from an output terminal 69.

In the second embodiment shown in FIG. 7, the low frequency component received at the terminal 60 is clamped in its pedestal level in the clamp circuit 61, and thereafter is supplied to a frequency modulator 70. In the frequency modulator 70, the low frequency component frequency modulates a carrier of 11.5 MHz generated by an oscillator. An AM variation component is removed from this low frequency component frequency modulated wave in the amplitude limiter 64. The frequency modulated wave is then supplied to an amplitude modulator 71. In the meanwhile, the high frequency component from the terminal 66 is supplied directly to the amplitude modulator 71 where the high frequency component amplitude modulates the carrier of the frequency modulated wave supplied from the amplitude limiter 64. Accordingly, a combined AM-FM wave is obtained from the output terminal 69.

Reverting to FIG. 2, the combined AM-FM wave from the modulator 30 is supplied to a high-pass filter 31. In the high-pass filter 31, a higher harmonics component (which is lower than the lower side band of the amplitude modulated wave) is removed so as to prevent an intermodulation distortion between the second and higher harmonics in the lower side band of the frequency modulated wave and the high frequency component during amplitude modulation. In the present embodiment, a component below 4.5 MHz is removed by the high-pass filter 31.

The output signal of the high-pass filter 31 is supplied to an amplifier 32 provided for compensating a difference in diameter. The amplifier 32 is controlled in its gain by an external DC voltage. As the pulse motor 15 makes an intermittent rotation as described above, the magnetic head 12 is fed from the outer periphery toward the inner periphery or from the inner periphery toward the outer periphery, in the radial direction across the magnetic disc 10.

Simultaneously with the rotation of the pulse motor 15, the value of the resistance of the variable resistor 17 changes. A DC voltage corresponding to the value of resistance of the variable resistor 17 is supplied to the amplifier 32; as a bias voltage. The value of this DC voltage varies linearly in accordance with the radial position of the magnetic head 12 on the magnetic disc 10 from its middle point. Accordingly, the signal from the high-pass filter 31 is controlled in the amplifier 32 at an optimum level in accordance with position of the magnetic head 12. Due to this level control, the level of the signal recorded by the magnetic head 12 is constantly maintained at an optimum level relative to an electromagnetic conversion characteristic, to be described later, with respect to all positions of the magnetic head 12, even though the relative linear velocity between the head and the magnetic disc varies.

The output signal of the amplifier 32 is divided into two channels and respectively supplied to gate circuits **33*a* and 33*b*. The gate circuits 33*a* and 33*b* alternately repeat an ON-OFF operation during every field, responsive to gates pulses which are supplied to a terminal 51 in synchronization with the vertical synchronizing signal of the input video signal. The signals obtained from the gate circuits 33*a* and 33*b* alternately, at every other field, are respectively supplied to equalizers 34*a* and 34*b*. The signals are provided with an optimum frequency-amplitude characteristic corresponding to the electromagnetic conversion characteristic. Then the two signals are respectively amplified in their level in amplifiers 35*a* and 35*b* and thereafter are supplied to the magnetic heads 12*a* and 12*b* via switching relay contacts 36*a* and 36*b* connected to contacts R. Thus, the signals are recorded on the concentric tracks formed alternately on the magnetic disc 10.**

The magnetic disc 10 is a plated disc of high quality and the linear velocity relative to the magnetic head 12 is at a high speed of 34 m/sec or more. Hence, the magnetic disc 10 has a good electromagnetic conversion characteristic. A high frequency signal of more than 17 MHz can be recorded and reproduced even at the innermost position where the relative linear velocity is at the minimum, as shown by a line VI in FIG. 5 which indicates the recordable and reproducible frequency. Since the magnetic disc type recording and reproducing apparatus is capable of recording and reproducing such a high frequency, the center frequency of the carrier is selected at a high frequency of 11.5 MHz. If a magnetic recording and reproducing apparatus with low relative linear velocity and electromagnetic conversion characteristic is used, the carrier frequency cannot be selected at such a high value, but it should be selected at a suitable frequency corresponding to the characteristics of the apparatus.

When the system is in a reproduction mode, the switching relay contacts **36*a* and 36*b* are switched to contacts P. The signals recorded in the above described manner are reproduced from the magnetic disc 10 by the magnetic heads 12*a* and 12*b*. The reproduced signals are supplied to pre-amplifiers 37*a* and 37*b* via the switching relay contacts 36*a* and 36*b*.**

The electromagnetic conversion characteristic of the magnetic head 12 and the magnetic disc 10 forms an ideal differential characteristic. Hence, the high frequency component amplitude modulated wave in the combined AM-FM wave, which has been recorded and reproduced by the magnetic head 12, is converted into a frequency modulated wave (hereinafter referred to as "converted into FM"). It and can be treated entirely in the same manner as the FM signal in the conventional vestigial side band FM system. Accordingly, the FM converted wave can hereafter be treated in the same manner as the above described low frequency component frequency modulated wave. This will be explained more in detail hereinbelow.

When a signal is magnetically recorded and reproduced on a magnetic medium by a magnetic head, a differential system is generally formed due to the electromagnetic conversion characteristic. In the differential system, the reproduced output voltage is in proportion to the rate of change of flux crossing the magnetic head.

Figure 8A:
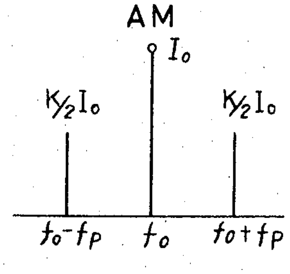
FIGS. 8A and 8B are diagrams respectively showing the spectra of the amplitude modulated wave and the frequency modulated wave.
Figure 8B:
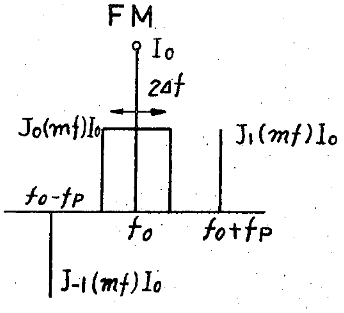

Generally, if a carrier fo is amplitude modulated by a modulating signal with an angular frequency P ($= 2\pi f_p$), an upper side band ($fo + fp$) and a lower side band ($fo - fp$) are symmetrically produced on both sides of the carrier fo, as shown in FIG. 8A. Likewise, if the carrier *fo* is frequency modulated by the modulating signal with the angular frequency P, an upper side band $(fo + fp)$ is produced in a positive direction relative to the carrier $fo$ and a lower side band $(fo - fp)$ is produced in a negative direction which is inverted in phase by 180° with respect to the upper side band, as shown in FIG. 8B.

Figure 9A:
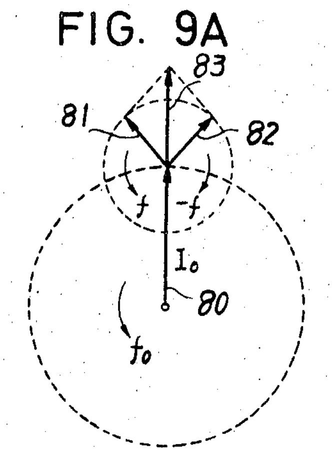
FIGS. 9A, 9B and 9C are respectively vector diagrams for explaining the conversion of the amplitude modulated wave into the frequency modulated wave.
Figure 9B:
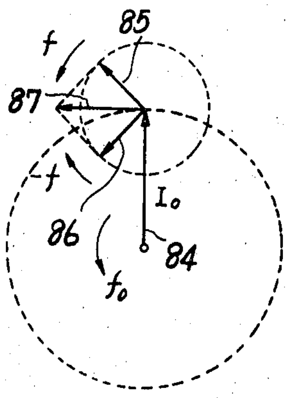

The amplitude modulated wave is represented by vectors in FIG. 9A. A composite vector 83 is a result of the upper and lower side bands vectors 81 and 82, which are of the same length and rotate in opposite directions with respect to each other. These vectors rotate about a foremost point of a carrier vector 80. Vector 83 varies, as the vectors 81 and 82 rotate, on a line which is extended from the carrier vector 80. On the other hand, the frequency modulated wave is represented by vectors in FIG. 9B. A composite vector 87 of is a result of the upper and lower side band vectors 85 and 86, which are of the same length and rotate in an opposite directions with respect to each other. These vectors rotate about a foremost point of a carrier vector 84. Vector 87 varies, as the vector 85 and 86 rotate, on a line which is at right angles with the carrier vector 84. The foregoing is a well-known matter.

Figure 5:
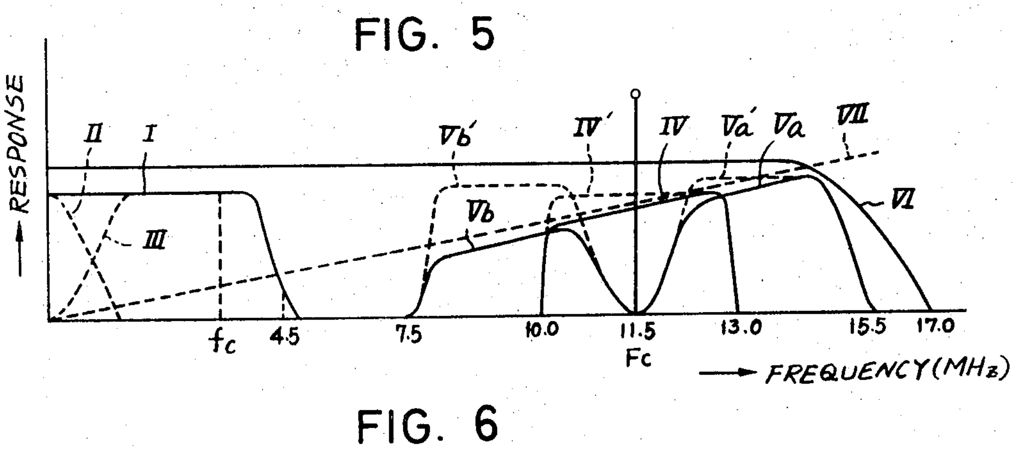
FIG. 5 is a diagram showing the frequency spectrum of the combined AM-FM wave.

The combined AM-FM wave recorded on and reproduced from the magnetic disc 10 by the magnetic head 12 is subject to the differentiating action due to the electromagnetic conversion characteristic which occurs during magnetic recording and reproducing by the magnetic head on the magnetic medium. This differentiating action is similar to an action of an ideal high-pass filter. Accordingly, the reproduced signal is subject to a differentiating response characteristic VII, as shown in FIG. 5. The frequency response of the frequency modulated wave is deformed as shown by a full line IV. The frequency responses of the upper and lower side bands of the amplitude modulated wave are deformed as shown by full lines V*a* and V*b*. Consequently, the lower side band of the amplitude modulated wave is reproduced in an attenuated state and so that the vectors of the upper and lower side bands are not of the same length.

Figure 9C:
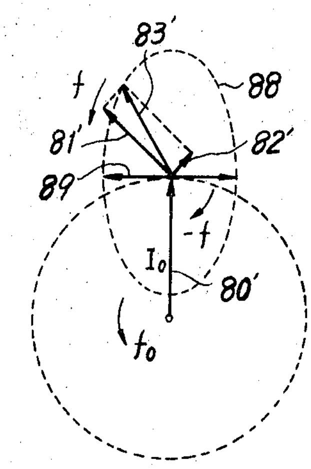

A vector diagram of the amplitude modulated wave at this state is shown in FIG. 9C. A composite vector 83' is a result of an upper side band vector 81' and a lower side band vector 82', which is shorter than the vector 81'. Vector 83 does not vary on a line extended from a carrier vector 80' as the vectors 81' and 82' rotate at the foremost end point of the carrier vector 80', but the foremost end point of the composite vector 83' draws an elliptical locus 88. This composite vector 83', which draws the elliptical locus 88, has a vector component 89 which is at right angles with respect to the carrier vector 80'. It will be apparent from this that the composite vector 83' has a vector component in the same direction as the direction of variation of the composite vector 87 of the frequency modulated wave. In other words, the vector component 89 appears as a component in the phase direction of the composite vector 83', i.e. cosine of the phase direction. The maximum length of the vector component 89 is equal to the difference between the length of the vector 81' and that of the vector 82'.

It will now be understood that the amplitude modulated wave which has passed through the differential system (a high-pass filter system), produced by the electromagnetic conversion characteristic, can be treated as an AM-FM converted frequency modulated wave in the vestigial side band system.

If a frequency modulated wave alone is used as a recording signal as in the conventional FM system, an unlimited number of side bands is produced on both sides of the carrier. The bandwidth used exclusively for the signal increases with frequency deviation ($\Delta f$). Accordingly, the modulation index mf cannot be made sufficiently large, particularly when a signal requiring a broad bandwidth, such as a video signal, is frequency modulated in its entire band. In the amplitude modulated wave, side bands having bandswidths equal to the band of the video signal are symmetrically produced on both sides of a carrier frequency $fo$. Since all information signal energy of the video signal is contained in these two side bands, a bandwidth required exclusively for the signal can be made narrower in the amplitude modulated wave than in the frequency modulated wave. Accordingly, the amplitude modulated wave is advantageous in that bands can be effectively utilized. Its circuit construction is simple and phase characteristic is excellent. However, a reproduced signal of the amplitude modulated wave cannot be limited in amplitude in an amplitude limiter and so it is disadvantageous in respect of level variation and modulation noise. Hence, an amplitude modulation has not been used to date for magnetic recording and reproducing of a video signal.

On the contrary, in the system according to the invention, the reproduced high frequency component amplitude modulated wave is converted into FM by the magnetic recording and reproducing and, accordingly, can be treated in an amplitude limiter. As a result, the signal is not affected by the level variation.

Reverting to FIG. 2, the explanation of the operation during the reproduction mode will be further continued. The reproduced signals supplied to the preamplifiers **37*a* and 37*b*, from the magnetic heads 12*a* and 12*b*, are amplified to a proper leve. The signals are equalized in their frequency characteristics in channel equalizers 38*a* and 38*b*. Thereafter, they are supplied to gate circuits 39*a* and 39*b*. Gate pulses are supplied to the gate circuits 39*a* and 39*b* from a terminal 52. The gate pulses are synchronized with the vertical synchronizing signal, and they vary in their width in accordance with the moving velocity of the magnetic head 12. The gate circuits 39*a* and 39*b* alternately make an ON-OFF operation, thereby transmitting the outputs of the equalizers 38*a* and 38*b* to the output side of the gate circuits and forming them into a continuous signal. The output continuous signal of the gate circuits 39*a* and 39*b* is corrected in a radius equalizer circuit 40 in the variation of the frequency-amplitude characteristic, due to the variation in the relative velocity between the magnetic head and the magnetic disc. This output signal is compensated in its signal dropout in a dropout compensator 41 and thereafter is supplied to an amplitude limiter 43, through a switching relay contact 42**, switched to a terminal P.

The reproduced signal supplied to the amplitude limiter 43 has its level variation, due to the electromagnetic conversion and amplitude variation due to amplitude modulation, sufficiently suppressed. The reproduced signal is made into a phase variation component. The reproduced signal is thereafter is supplied to a frequency modulator 44. Accordingly, the level variation is effectively removed not only from the frequency modulated wave but also from the amplitude modulated wave of the combined AM-FM wave.

Figure 10A:
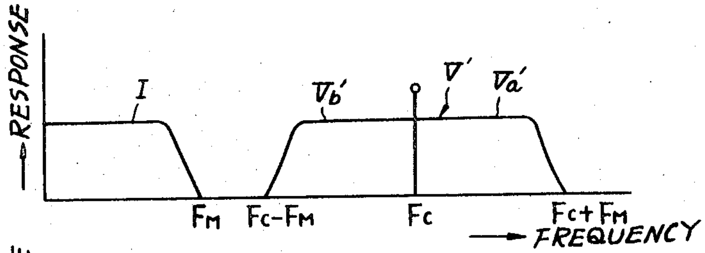
FIGS. 10A, 10B and 10C are respectively frequency response characteristic diagrams for explaining converting of the amplitude modulated wave into the frequency modulated wave and frequency demodulation thereof.
Figure 10B:
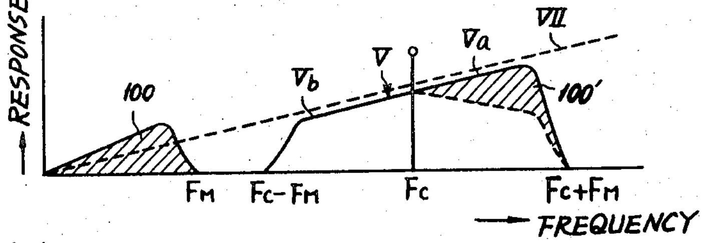

The amplitude modulated wave V' has upper and lower side-bands *Va'* and *Vb'*, shown in FIG. 10A which is a part taken from FIG. 5. Wave V' is converted into FM with its upper and lower side bands changed into characteristics *Va* and *Vb* shown in FIG. 10B. This conversion occurs as the signal passes through the differential system shown by a response characteristic VII produced by the magnetic recording and reproducing. When the amplitude modulated wave V thus converted into FM is demodulated, a difference between the upper side band *Va* and the lower side band *Vb* is developed as the output of the demodulator. Namely, a portion equivalent to a shaded portion 100' in FIG. 10B is obtained as a demodulated output 100. It will be readily understood that, even if the amplitude modulated wave V' is frequency demodulated, the difference between the symmetrical upper and lower side bands is zero and therefore no demodulated output will be produced.

Since the demodulated output is a difference between the upper and lower side bands, it is difficult to demodulate the frequency band in the vicinity of the carrier *Fc*, i.e. an extremely low frequency band of the video signal. Particularly, a zero frequency (a DC component) is not demodulated at all. Accordingly, it is desirable to divide the band of the video signal into a low frequency component and a high frequency component at a selected frequency on the order of 1 to 1.5 MHz (1.4 MHz in the present embodiment) with overlapping frequency characteristic of rise and fall of 6 dB/oct. The system frequency modulates the low frequency component and amplitude modulates the high frequency component alone. Further, it is theoretically possible to demodulate, if desired, the low frequency component by frequency converting the low frequency component and thereafter amplitude modulating it or by designing a frequency demodulator having a suitable frequency discriminator characteristic.

Figure 10C:
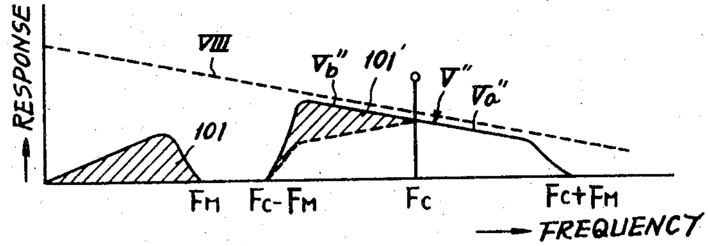

If the amplitude modulated wave is made into a modulated wave V'', having upper and lower side bands *Va''* and *Vb''* shown in FIG. 10C, by passing it through an integration system having a frequency response characteristic shown by a line VIII, a demodulated output 101 corresponding to a difference 101' between the upper and lower side bands *Va''* and *Vb''* is obtained by frequency demodulating it. In this case, the lower side band, which has a good signal to noise ratio, can be positively utilized. For the same reason, if the lower side band alone of the signal having passed through the differential system is used, the reproduced amplitude modulated wave converted into FM through the differential system can be frequency demodulated after removing or extremely suppressing the upper side band through a low-pass filter. In this case, a demodulated output is obtained as a difference between the lower side band and the upper side band which is attenuated to a larger degree than the lower side band. In this demodulated output, the lower side band is positively used. Accordingly, the demodulation system utilizing the lower side band after the signal has passed the differential system can be realized. Although, efficiency of this system may have to be sacrificed to some extent.

The reproduced combined AM-FM wave including the amplitude modulated wave converted into FM is supplied to a frequency demodulator 44 where it is frequency demodulated. The low frequency component frequency modulated wave and the high frequency component amplitude modulated wave converted into FM are simultaneously frequency demodulated and combined into the original signal as it appeared before the band division, i.e. the signal shown by the line I in FIG. 3, which is equal to the sum of the signals shown by the lines II and III in FIGS. 4A and 4B. As previously described, the band division is made in the recording system by subtraction by using the low-pass filter 24 and the differential amplifier 28. Accordingly, no phase distortion occurs between this demodulated low frequency component and the demodulated high frequency component, in combining these two frequency component.

The signal demodulated in the frequency demodulator 44 is supplied to a low-pass filter 45 where an unnecessary signal component is removed. Thereafter, the signal is supplied to a de-emphasis circuit 46 where the inclination of the frequency amplitude characteristic given in the above-described pre-emphasis circuits 26 and 29 is cancelled. As a result, the signal has a flat characteristic. The output of the de-emphasis circuit 46 is supplied to an amplifier 48 for compensating for a diameter difference. In the amplifier 48, the diameter difference is compensated by the DC bias voltage supplied via the variable resistor 17. This bias varies in accordance with the position, in the radial direction, of the magnetic head 12 on the magnetic disc 10. Thus, the frequency amplitude characteristic does not vary depending upon the position of the magnetic head. The output of the amplifier 48 is transmitted through a switching relay 49 contact switched to a contact P and is obtained from an output terminal 50 as a reproduced color video signal having the original characteristic shown by the line I in FIG. 3.

In case the signal is reproduced, not through the system of the magnetic head the magnetic disc, but through an electric system (E-E system) alone, the contacts of the switching relays 42 and 49 are switched to contacts E. In this case, the combined AM-FM wave which is the output of the modulator 30 is directly supplied to the frequency demodulator 44 through the relay contacts 42 and the amplitude limiter 43. In this frequency demodulator 44, however, the amplitude modulated wave having symmetrical upper and lower side bands is not demodulated. The low frequency component frequency modulated wave is demodulated. This demodulated low frequency component is supplied to a mixer 47 through the low-pass filter 45 and the de-emphasis circuit 46. In the meanwhile, the output high frequency component of the differential amplifier 28 is also supplied to the mixer 47. The low frequency component and the high frequency component are mixed together in the mixer 47. Consequently, the output of the mixer 47 is transmitted through the relay contacts 49 and is obtained from the terminal 50 as a video signal of the E-E system as shown by the line I in FIG. 3.

With regard to the above described embodiment, the description has been made with reference to the case wherein the system, according to the invention, is applied to the magnetic recroding and reproducing apparatus of a rotary magnetic disc type. The invention is not limited to this but it is applicable to a magnetic video recording and reproducing apparatus (so-called VTR) using a magnetic tape. In this case, the relative linear velocity between the magnetic head and the magnetic tape is constant. Thus, the amplifiers 32, 48, the equalizer 40, and the variable resistor are not required for compensating for the diameter difference.

Figure 11A:
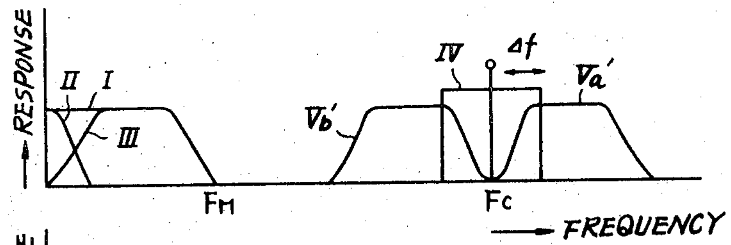
FIGS. 11A and 11B are respectively diagrams showing frequency response characteristics in the case wherein the system according to the invention is employed in a magnetic recording and reproducing apparatus having a low relative linear velocity.
Figure 11B:
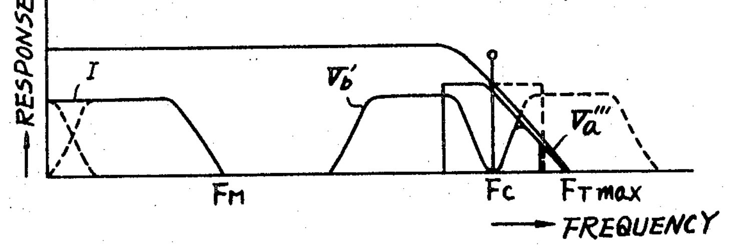

Next to be described is an embodiment of the system according to the invention applied to an apparatus such as a VTR in which the relative linear velocity is relatively low. If the relative linear velocity is low, the upper limit frequency of the apparatus at which recording and reproducing are possible also becomes low. Accordingly, in recording a combined AM-FM wave shown in FIG. 11A is formed in the same manner as in the above described embodiment. If a carrier Fc is selected at a frequency which is in the vicinity of the recordable upper limit frequency $F_{Tmax}$ as shown in FIG. 11B, the upper side band of the amplitude modulated wave recorded on the magnetic tape is attenuated to a large degree and becomes barely noticeable as shown by a line $Va'''$. When this amplitude modulated wave is reproduced by a magnetic head, its lower side band $Vb'$ is suppressed due to the electromagnetic conversion characteristic. Its upper side band $Va'''$ is attenuated to a larger degree than the lower side band $Vb'$. Hence, the relation between the upper and lower side bands of the amplitude modulated wave becomes the same as if these side bands passed through a kind of integration system, as was described with reference to FIG. 10C. Accordingly, the signal is obtained with a lower side band component having good signal to noise ratio relatively emphasized.

The video signal to be recorded and reproduced may either be a monochrome video signal or a color video signal. With regard to a color video signal, the conventional FM system in which the entire band is frequency modulated causes an intermodulation between its chrominance subcarrier and the frequency modulated carrier. In the system according to the invention, the high frequency is divided and amplitude modulated. Therefore, no intermodulation occurs and a good reproduced color picture can be obtained.

Summing up, the system according to the invention applied to a magnetic recording and reproducing apparatus has the following features and advantages:

1. The system amplitude modulates a signal to be recorded and records and reproduces it magnetically on a magnetic medium. The system then frequency demodulates the reproduced amplitude modulated wave by utilizing the phenomenon that the upper and lower side bands of the amplitude modulated wave become asymmetrical and converted into FM through the differential system produced by the electromagnetic conversion characteristic. This enables the reproduced amplitude modulated wave to pass through an amplitude limiter. As a result, the level variation and modulation noise can be effectively removed. The signal to noise ratio of the amplitude modulated wave is remarkably improved. Besides, advantages of an amplitude modulated wave, such as an efficient band utilization and a good phase characteristic, are effective relative to an angle modulated wave.

2. The signal to be recorded is divided into a low frequency component and a high frequency component. The low frequency component alone is angle modulated. The angle modulated wave is made a carrier and amplitude modulated by the high frequency component. Accordingly, the frequency band can be effectively utilized. Again, according to the system, the low frequency component alone, which is about one third to a quarter of the entire band, is angle modulated. Accordingly, a large frequency deviation can be used. The modulation index mf can be made large (for example, more than three times that of the conventional FM system). Thus, a reproduced signal having a good signal to noise ratio can be obtained. When a video signal is used as the signal to be recorded, a reproduced picture of a good quality is obtained because the signal to noise ratio of the low frequency component which greatly influences the signal to noise ratio in constructing the video signal is good.

3. Since the low frequency component angle modulated wave is amplitude modulated by the high frequency component, the carrier of the combined AM-FM wave is coincidental. Accordingly, no intermodulation occurs between the angle modulated wave and the amplitude modulated wave. With regard to recording and reproducing of a color video signal, if an entire band is frequency modulated as in the conventional FM system, intermodulation occurs between the chrominance subcarrier and the carrier frequency resulting in occurrence of Moire effects. In the system according to the invention, the high frequency component including chrominance subcarrier is divided out and amplitude modulated. Therefore occurrence of the intermodulation distortion can be avoided.

4. In the conventional FM system in which the entire band of a signal is frequency modulated, frequency deviation cannot be made large because linearity deteriorates Distoration in waveform increases in addition to the problem that a required bandwidth is large. The system according to the invention has no such problems because a low frequency component alone is angle modulated. Particularly, a color video signal is recorded and reproduced with an excellent linearity and phase characteristic because a high frequency component is amplitude modulated.

5. The division of the signal into a low frequency component and a high frequency component is made only in a recording system. In the reproducing system, the low frequency component angle modulated wave and the high frequency component amplitude modulated wave converted into FM are simultaneously frequency demodulated and taken out in the form of a combined signal. Accordingly, the signal passes through a minimum number of filters and a combined signal of the low frequency component. The high frequency component can be obtained without any adverse effects on the characteristic of the joint portion of the two components.

In the above described embodiments, the system according to the invention has been described with reference to the case wherein the system is applied to a magnetic recording and reproducing apparatus. However, the system according to the invention is applicable to transmission of signals in general. For example, the upper and lower side bands of an amplitude modulated wave propagated in radio wave and received at a receiving side of an AM broadcasting system may be made asymmetrical by utilizing a differential system or an integration system (or a high-pass filter or a low-pass filter) and converted into FM for frequency demodulation.

Further, in the above described embodiments, the frequency modulated wave and the amplitude modulated wave are produced from the low frequency component and the high frequency component which are obtained by dividing the video signal. However, the signal from which each modulated wave is to be obtained need not be a signal obtained by dividing a single signal. The modulated wave to be combined with the amplitude modulated wave need not be a frequency modulated wave as in the foregoing embodiments but it may be other modulated waves such as PPM, PAM, PWM and PCM. Furthermore, a direct wave an amplitude modulated wave may be transmitted by superposing one upon the other without forming a combined modulated wave. The signal may even be transmitted by an amplitude modulated wave along.

Further, this invention is not limited to these embodiments but various variations and modifications may be made without departing from the scope and spirit of the invention.

What we claim is:

1. A signal modulating and demodulating system comprising means for amplitude modulating at least a part of a signal to be transmitted, said modulated signal having upper and lower side bands, means for transmitting the amplitude modulated wave, means for attenuating one of the side bands of said amplitude modulated wave more than the other one of said side bands and making said upper and lower side bands asymmetrical with respect to each other by transmission, means for limiting the amplitude of the signal transmitted by said transmitting means and for eliminating the amplitude modulation component of said transmitted signal, and means for frequency demodulating the signal limited by said limiting means and for producing a demodulated output which is equal to the difference between said upper side band and lower side band.

2. The signal modulating and demodulating system as defined in claim 1 in which said means for making the side bands asymmetrical have a differential system which attenuates the lower side band of said amplitude modulated wave more than the upper side band thereof.

3. The signal modulating and demodulating system as defined in claim 1 in which said means for making the side bands asymmetrical has an integration system which attenuates the upper side band of said amplitude modulated wave more than the lower side band thereof.

4. A signal modulating and demodulating system in a magnetic recording system comprising means for amplitude modulating at least a part of a signal to be recorded to thereby produce upper and lower side bands, means for recording the amplitude modulated signal on a magnetic medium and for reproducing the signal recorded on the magnetic medium by said recording means, means for differentiating the amplitude modulated signal and for attenuating the lower side band more than the upper side band and for making the upper and lower side bands asymmetrical with respect to each other, limiting means for limiting the amplitude of the signal reproduced by said reproducing means, means for angle demodulating the signal limited by the limiting means, and means for producing a demodulated output which is equal to the difference between said upper side band and lower side band.

5. The signal modulating and demodulating system as defined in claim 4 in which said signal to be recorded is a video signal and said magnetic recording and reproducing means comprises a rotary magnetic disc, means for rotating said disc at a relatively high speed, means comprising a magnetic head mounted for moving radially across said rotary magnetic disc, and means for recording and reproducing signals on said rotary magnetic disc, said last named means having a high-pass filter characteristic due to the electromagnetic conversion characteristic with respect to said amplitude modulated wave.

6. The signal modulating and demodulating system as defined in claim 5 which further comprises means for obtaining a control voltage which varies in accordance with the radial position of said magnetic head, and means for controlling the output level of the modulated wave of said modulating means and the output level of the demodulated wave of said demodulating means.

7. A signal modulating and demodulating system in a magnetic recording and reproducing system comprising means for separating a signal to be recorded into a low frequency component and a high frequency component, frequency modulating means for frequency modulating the low frequency component separated by said separating means, amplitude modulating means for amplitude modulating the frequency modulated signal with the high frequency component and for producing a combined AM-FM wave having upper and lower side bands, means for recording the combined AM-FM wave on a magnetic medium, means for reproducing the recorded signal from said magnetic medium, means for differentiating the combined AM-FM wave, means for attenuating the lower side band of said combined AM-FM wave more than the upper side band thereof and for making the upper and lower side bands asymmetrical to each other, limiting means for limiting the amplitude of the signal reproduced by said reproducing means, and means for angle demodulating the signal limited by said limiting means, said angle demodulating means producing a demodulated output which includes a component equal to the difference between said upper and lower side bands.

8. The signal modulating and demodulating system as defined in claim 7 in which said separating means comprises filter means for filtering either the low frequency component or the high frequency component of said signal to be recorded, and differential amplifying means for subtracting said filtered component from said signal to obtain the difference component.

9. A signal modulating and demodulating system in a magnetic recording and reproducing system comprising means for separating a signal to be recorded into a low frequency component and a high frequency component, frequency modulating means for frequency modulating said separated low frequency component, means for amplitude modulating said separated high frequency component by using a carrier having a frequency which is different from the frequency of the carrier of said frequency modulated wave, frequency converting means for mixing the frequency modulated wave from said frequency modulating means and the amplitude modulated wave from said amplitude modulating means and for frequency converting these two modulated waves to obtain a combined AM-FM wave with upper and lower side bands, said AM-FM wave having a frequency which is equal to the difference between said two modulated waves, means for recording the combined AM-FM wave on a magnetic medium, means for reproducing the recorded signal from said magnetic medium, means for differentiating the combined AM-FM wave and for attenuating the lower side band of said combined AM-FM wave more than the upper side band thereof while making the upper and lower side bands asymmetrical to each other, limiting means for limiting the amplitude of the signal reproduced by said reproducing means, and means for angle demodulating the signal limited by said limiting means, said angle demodulating means producing a demodulated output which includes a component equal to the difference between said upper and lower side bands

10. A signal modulating and demodulating system in a magnetic recording and reproducing system comprising means for amplitude modulating at least a part of a signal to be recorded, said amplitude modulated signal having upper and lower side bands, means for recording the amplitude modulated signal on a magnetic medium, means for reproducing the signal recorded on the magnetic medium by said recording means, said recording means having an upper limit recordable frequency such that the upper side band of said amplitude modulated wave is greatly attenuated during recording and the amplitude modulated wave reproduced by said reproducing means has a slightly attenuated lower side band, whereby said upper side band is attenuated more than said lower side band, limiting means for limiting the amplitude of the signal reproduced by said reproducing means, said reproduced signal having upper and lower side bands asymmetrical to each other, and means for angle demodulating the signal limited by the limiting means and for producing a demodulated output which is equal to the difference between said upper and lower side bands.

* * * * *